C. H. HACKETT & T. W. MORGAN.
ELASTIC COLLAR BEARING FOR CENTRIFUGAL MACHINES.
APPLICATION FILED AUG. 19, 1907.

961,345.

Patented June 14, 1910.

WITNESSES:
H. M. Harper.
J. McCarty.

INVENTORS
Charles H. Hackett and
Thomas W. Morgan.
BY
G. C. Kennedy.
ATTORNEY

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

ELASTIC COLLAR-BEARING FOR CENTRIFUGAL MACHINES.

961,345. Specification of Letters Patent. Patented June 14, 1910.

Application filed August 19, 1907. Serial No. 389,182.

*To all whom it may concern:*

Be it known that we, CHARLES H. HACKETT and THOMAS W. MORGAN, citizens of the United States of America, and residents of Waterloo, Blackhawk county, Iowa, have invented certain new and useful Improvements in Elastic Collar-Bearings for Centrifugal Machines, of which the following is a specification.

Our invention relates to improvements in elastic collar-bearings for centrifugal machines, and the object of our improvement is to provide improved means for lubricating such a bearing, and particularly to effect an improvement in the elastic collar-bearing which was patented by the United States to Thomas W. Morgan, on August 16th, 1904, under Number 767,524. This object we have accomplished by the means which are hereinafter described and claimed, and which are illustrated in the accompanying drawings, in which:—

Figure 1:
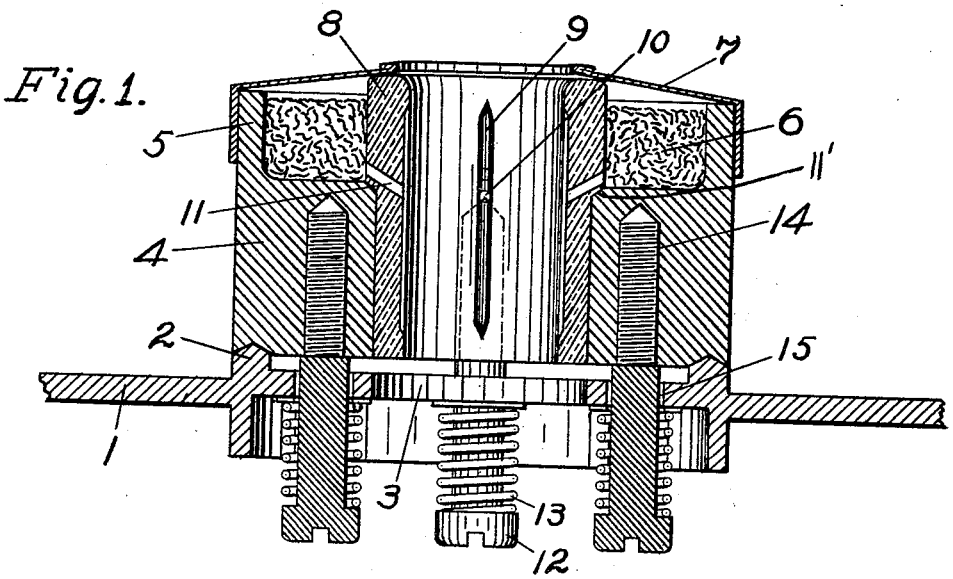
Figure 2:
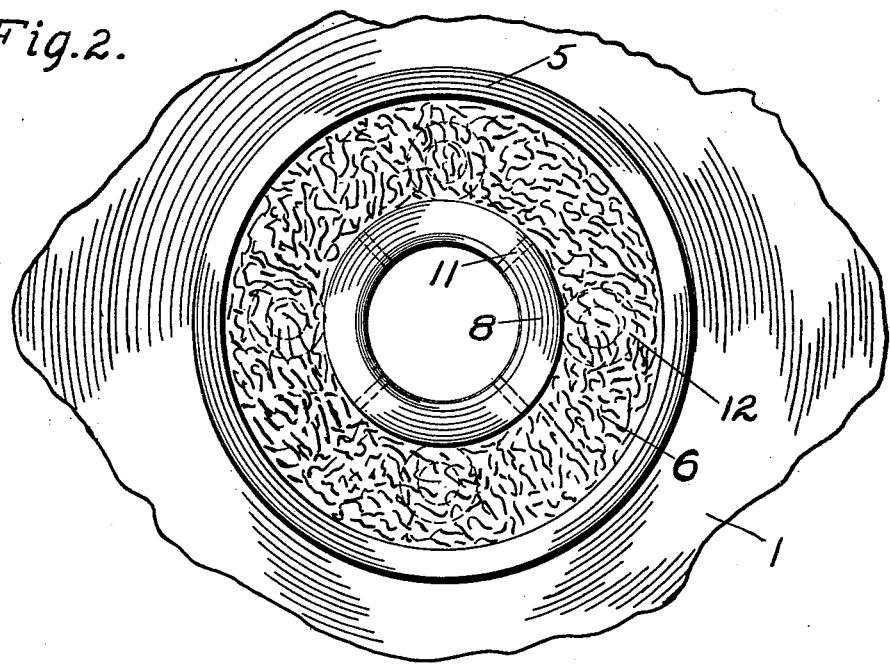

Figure 1 is a central vertical axial section of our said improved elastic collar-bearing for centrifugal machines, and Fig. 2 is an upper plan view of the same, with the dust-cap removed.

Similar reference characters refer to similar parts throughout the several views.

The base-plate 1, whose outer edge is represented as broken away, has a circular central opening 3 through which a rotating spindle, such as the spindle of a centrifugal separator, may protrude. Near the edge of said opening smaller openings 15 are provided in said plate for the reception of the screws 12, which however do not necessarily contact with the walls of said openings. Spaced away a sufficient distance from the opening 3 so as to clear the openings 15, a raised annulus 2 concentric with the opening 3 projects upwardly from the upper surface of said base-plate, the upper surface of the annulus being pitched from a central line both ways obliquely downward at a small angle.

The numeral 4 denotes a cylindrical bushing having on its under surface a recessed annular groove the counterpart of the upper surface of the annulus 2, and adapted to register with and embrace the latter. The upper end of said bushing has its outer surface continued upward to form an annular flange 5. Inside the bushing 4 is removably seated another cylindrical hollow bushing 8, having an exterior shoulder 11' adapted to be seated upon the inner upper edge of the bushing 4. The annular space between the upper part of the bushing 8 and the flange 5 on the bushing 4 forms a trough in which is placed a packing made of any suitable fibrous substance 6, and which is saturated with an oil lubricant. The numeral 7 denotes a dust-cap superposed upon the said bushings to cover the trough containing the packing 6.

The numeral 9 denotes shallow vertical grooves in the interior face of the bushing 8, and the orifices 11 afford a communication between the trough aforesaid and said grooves, whereby the interior face of said bushing is constantly lubricated. This method of packing the trough is necessary, since the oscillatory movements imparted to the bushings caused by the rapidly revolving spindle therein tends to violently project the oil therefrom, the fibrous packing serving to retain the lubricant *in situ*.

To prevent the bushings becoming displaced from the base-plate, the screws 12 are secured therein, entering the openings 15 and 14. The barrel of each screw nearest its head is enlarged and a compression-spring 13 mounted thereabout, between its head and the said base-plate, and thus affords a resilient connection between the base-plate and the bushing 4, whereby, when the bushing is drawn away it is caused to return and bring the annular groove in the bushing to be re-seated over the annulus 2. In this way, the bushings are automatically centered.

Having described our invention, what we claim as new, and desire to secure by Letters Patent, is:—

An elastic collar-bearing comprising a base plate, a bushing resiliently mounted thereon and having a central bore, a peripheral flange on the upper end of said bushing, a bearing loosely mounted in the bore of said bushing and forming a lubricant chamber with said flange, a shoulder therein for supporting said bearing, said bearing having radial ducts and connected elongated grooves on the inner surface of said bearing.

Signed at Waterloo, Iowa, this 30th day of July, 1907.

CHARLES H. HACKETT.
THOMAS W. MORGAN.

Witnesses:
O. D. Young,
H. M. Harper.